(12) United States Patent
McNulty

(10) Patent No.: US 10,406,573 B2
(45) Date of Patent: Sep. 10, 2019

(54) METHOD OF MAKING A BATTERY TRAY

(71) Applicant: Francis G. McNulty, Estero, FL (US)

(72) Inventor: Francis G. McNulty, Estero, FL (US)

( * ) Notice: Subject to any disclaimer, the term of this patent is extended or adjusted under 35 U.S.C. 154(b) by 0 days.

(21) Appl. No.: 16/234,030

(22) Filed: Dec. 27, 2018

(65) Prior Publication Data

US 2019/0193130 A1 Jun. 27, 2019

(51) Int. Cl.
| | | |
|---|---|---|
| *B21B 1/38* | (2006.01) | |
| *H01M 2/10* | (2006.01) | |
| *B23P 15/26* | (2006.01) | |
| *B21D 39/03* | (2006.01) | |

(52) U.S. Cl.
CPC .............. *B21B 1/38* (2013.01); *B21D 39/032* (2013.01); *B23P 15/26* (2013.01); *H01M 2/1083* (2013.01); *H01M 2/1094* (2013.01); *H01M 2220/20* (2013.01)

(58) Field of Classification Search
CPC .......... B21D 5/08; B21D 5/083; B21D 39/03; B21D 39/031; B21D 39/032; B21D 39/038; H01M 2/1072; H01M 2/1083; H01M 2220/20; B23P 11/00; B23P 15/26; B21B 1/38; B21B 2001/386
See application file for complete search history.

(56) References Cited

U.S. PATENT DOCUMENTS

| | | | | |
|---|---|---|---|---|
| 2,708,958 A | * | 5/1955 | Crafton ................... | B21D 5/08 29/463 |
| 3,448,203 A | * | 6/1969 | Somes, Jr. ............... | H02G 5/04 174/40 R |
| 4,433,565 A | * | 2/1984 | Preller ..................... | B21B 1/08 72/177 |
| 7,430,806 B2 | * | 10/2008 | McNulty ................ | B62D 33/02 29/469.5 |
| 2012/0080938 A1 | * | 4/2012 | Rutkowski .......... | H01M 2/1077 307/9.1 |
| 2013/0164577 A1 | * | 6/2013 | Insana .................. | H01M 2/1077 429/72 |
| 2015/0349389 A1 | * | 12/2015 | Kobune .............. | H01M 2/1077 429/90 |
| 2016/0204401 A1 | * | 7/2016 | Curtis ................. | H01M 2/1077 429/153 |
| 2018/0337377 A1 | * | 11/2018 | Stephens ............. | H01M 2/1083 |

* cited by examiner

*Primary Examiner* — Edward T Tolan
(74) *Attorney, Agent, or Firm* — Eldredge Law Firm, LLC; Richard Eldredge

(57) ABSTRACT

A method of forming a car battery tray, the method includes continuously roll-forming a first sheet of metal into a bottom tray, the bottom tray having a first compartment with side walls and to receive a first battery, and the bottom tray having an opening formed into one of the side walls; and continuously roll-forming a second sheet of metal into a top tray, the top tray having a protrusion to engage with the opening of the bottom tray; the bottom tray and top tray connect to secure the first battery in place; the bottom tray and top tray form the car battery tray.

4 Claims, 4 Drawing Sheets

METHOD OF MAKING A BATTERY TRAY

BACKGROUND

1. Field of the Invention

The present invention relates generally to battery trays and methods of making battery trays, and more specifically, to a method of making a battery tray such as for a car, wherein the method include roll forming one or more sheets of metal, thereby providing for a battery tray that is stronger, and less expensive than conventional battery trays.

2. Description of Related Art

Methods of making battery trays are well known in the art. For example, FIG. 1 depicts a conventional method 101 of making a car battery tray, wherein a compartment for a battery is created by stamping into a material, such as aluminum, as shown with box 103. A cover is then cut out of aluminum or other material to fit over the battery and secure the battery within the compartment, as shown with boxes 105, 107, 109.

One of the problems commonly associated with system 101 is limited strength. For example, conventional car battery trays do not stand up to crashes and impacts as they should. In addition, the trays are expensive to make and manufacture.

Accordingly, although great strides have been made in the area of methods of making car battery trays, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
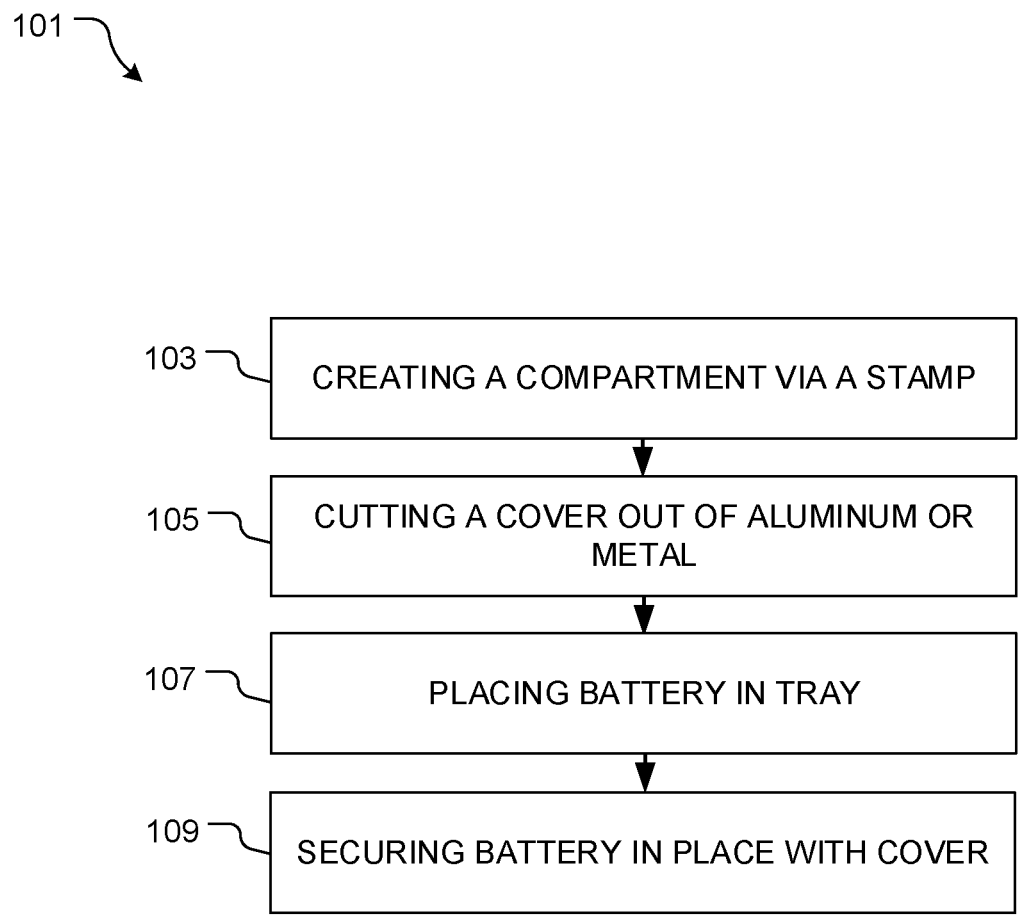
FIG. 1 is a flowchart of a common method of making a car battery tray.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional methods of making car battery trays. Specifically, the present invention provides for a method of creating car battery trays that are durable, fast to manufacture, and cheaper than conventional methods. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
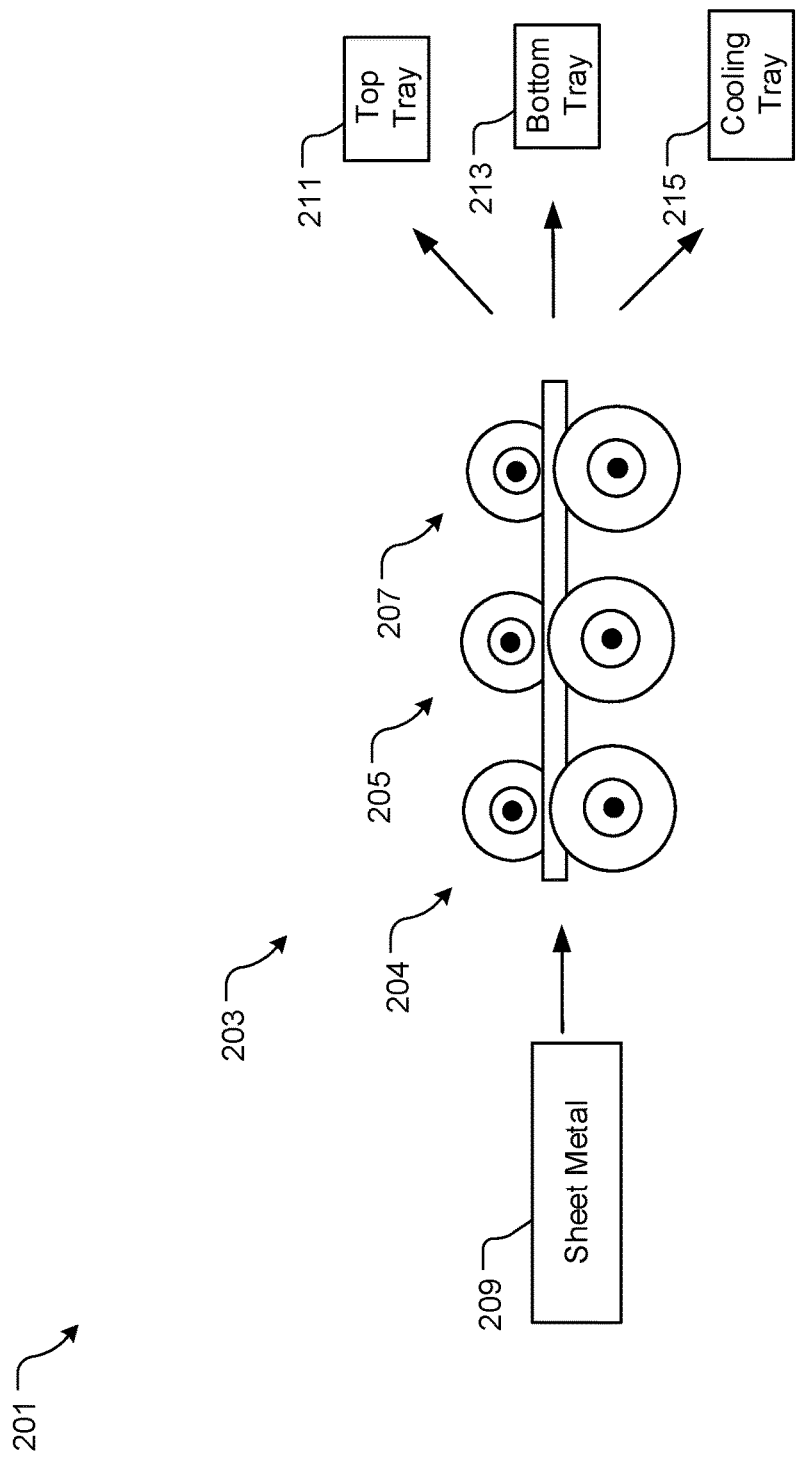
FIG. 2 is a schematic of a method of making a car battery tray in accordance with a preferred embodiment of the present application.

Referring now to the drawings wherein like reference characters identify corresponding or similar elements throughout the several views, FIG. 2 depicts a schematic of a method 201 of creating a car battery tray in accordance with a preferred embodiment of the present application. It will be appreciated that method 201 overcomes one or more of the above-listed problems commonly associated with conventional car battery tray systems.

In the contemplated embodiment, method 201 includes a roll-forming machine 203 having a plurality of stations 204, 205, 207 configured to receive sheet metal 209 and bend the sheet metal to create a top tray 211, a bottom tray 213, and a cooling tray 215. It should be appreciated and understood that roll forming is a cold forming process, wherein the sheet metal is fed into the machine, and bent by passing the metal between each set of rollers, resulting in continuous deformation. Each station of the machine has an incremental part of the bend, thereby creating a resulting product that has the desired profile. It is contemplated that the sheet metal could be a variety of metals, including steel and aluminum. Once the sheet metal is bent to the desired profile, it can be cut into sections, thereby resulting in a plurality of trays.

Figure 3:
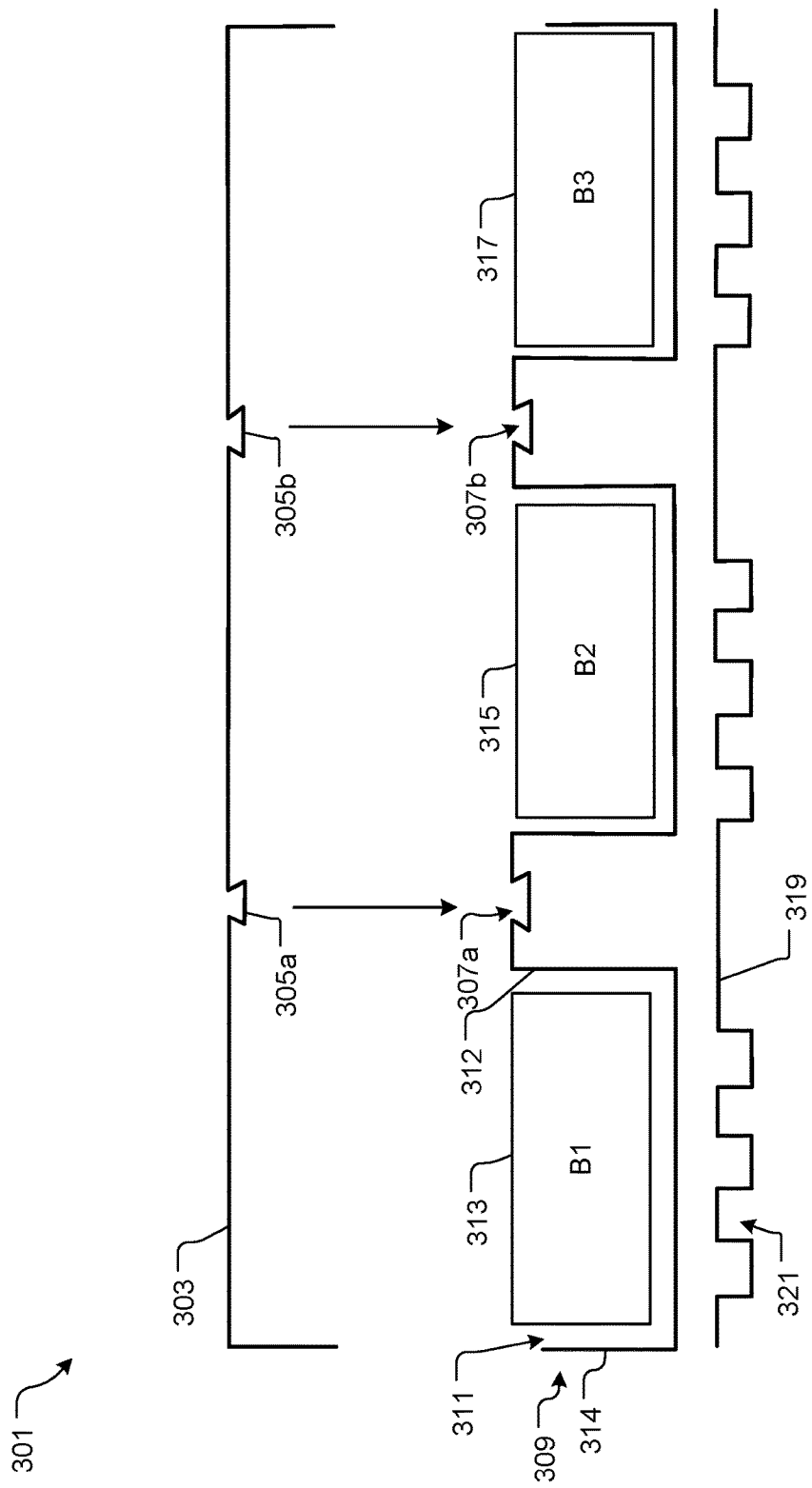
FIG. 3 is a side view of a car battery tray as created by the method of FIG. 2.

In FIG. 3, a profile side view demonstrates one embodiment of a tray 301 created during method 201. A top tray 303 is shown having a plurality of protrusions 305*a-b* configured to align with and engage with a plurality of openings 307*a-b* in bottom tray 309. As shown, bottom tray 309 is bent to further include one or more compartments 311, with walls 312, 314 to receive batteries 313, 315, 317 therein. The top tray 303 secures to bottom tray 309 to hold the batteries in place.

It should be appreciated that bottom and top trays 303, 309 can be scaled up or down to accommodate more or fewer batteries. In addition, the exact style can be altered to achieve the same function.

As further shown, it is contemplated having a cooling tray 319 having a plurality of rolls 321 bent therein, thereby providing air flow underneath each of the batteries and configured to cool the batteries. In this embodiment, condenser tubes can be used to further dissipate heat.

It should be appreciated that one of the unique features believed characteristic of the present application is the use of roll-forming to create a battery tray, thereby providing a battery tray configuration that is cheaper to produce than conventional battery trays, and further that is strong and durable.

Figure 4:
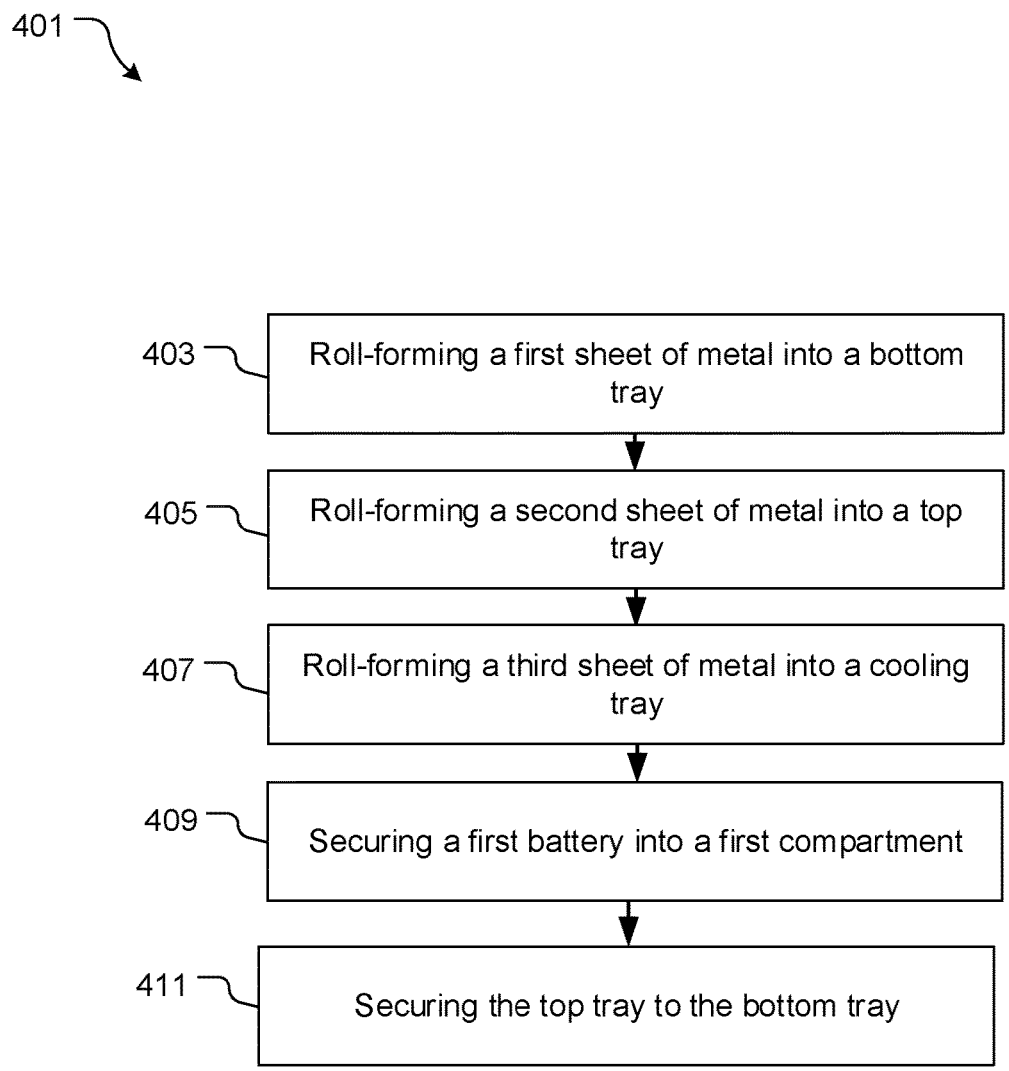
FIG. 4 is a flowchart of the method of FIG. 2.

In FIG. 4, a flowchart 401 depicts the method 201. During production, roll-forming is used to turn a first sheet of metal into a bottom tray, while a second and third sheet are used to create a top tray and a cooling tray, as shown with boxes 403, 405, 407. The three sheets can be secured together, wherein a battery is secured within one of the compartments and secured in place via the top and bottom trays, as shown with boxes 409, 411.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of forming a car battery tray, the method comprising:
    continuously roll-forming a first sheet of metal into a bottom tray, the bottom tray having a first compartment, a second compartment, and a third compartment with side walls and configured to receive a first battery, a second battery, and a third battery, respectively, and the bottom tray having a plurality of openings formed into the side walls; and
    continuously roll-forming a second sheet of metal into a top tray, the top tray having a plurality of protrusions configured to engage with the opening of the bottom tray;
    locking the plurality of protrusions to the plurality of openings;
    securing the first battery, the second battery, and the third battery in a position adjacent to each other and disposed between the first sheet metal and the second sheet metal;
    wherein the bottom tray and top tray connect to secure the first battery, the second battery, and the third battery in place; wherein the bottom tray and top tray form the car battery tray.

2. The method of claim 1, wherein the first and second sheets of metal are composed of a steel.

3. The method of claim 1, wherein the first and second sheets of metal are composed of an aluminum.

4. The method of claim 1, further comprising:
    roll-forming one or more condenser tubes; and
    positioning the one or more condenser tubes underneath the bottom tray to aid in dissipation of heat.

* * * * *